US006361639B1

(12) United States Patent
Owen et al.

(10) Patent No.: US 6,361,639 B1
(45) Date of Patent: Mar. 26, 2002

(54) METHOD OF MANUFACTURING AN INDEX DIVIDER SHEET ASSEMBLY

(75) Inventors: Sonia Owen, Covina; Galen C. Wong, Pasadena; Richard M. Housewright, II, Glendora, all of CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/310,499

(22) Filed: May 12, 1999

(51) Int. Cl.[7] ................................................ B32B 31/00

(52) U.S. Cl. ....................... 156/211; 156/226; 156/227; 156/247; 156/252; 156/268; 156/277; 83/37; 83/38; 83/41; 83/70; 83/74; 83/81; 83/84; 83/106; 402/79; 402/80 R; 420/121; 420/192; 428/77; 428/81; 428/84

(58) Field of Search ....................... 83/81, 84; 156/202, 156/211, 227, 277, 252, 268, 247, 226; 283/37, 38, 41, 70, 74, 106; 420/121, 192; 402/79, 80 R; 428/77, 81, 84

(56) References Cited

U.S. PATENT DOCUMENTS 5,558,454 A * 9/1996 Owen .......................... 402/79
5,586,829 A * 12/1996 Schwartz ..................... 402/79
5,743,566 A * 4/1998 Hunter et al. ................. 283/36
5,792,297 A * 8/1998 Hunter et al. ............... 156/211
5,836,710 A * 11/1998 Owen .......................... 402/79
6,012,866 A * 1/2000 Podosek ...................... 402/79

FOREIGN PATENT DOCUMENTS

WO 98/07582 * 2/1998
WO 98/41406 * 9/1998

* cited by examiner

*Primary Examiner*—Linda Gray
(74) *Attorney, Agent, or Firm*—Oppenheimer Wolff & Donnelly LLP

(57) ABSTRACT

A method for manufacturing an index divider sheet assembly adapted for feeding into ink jet printers and the like for a printing operation on the sheet body and/or the index tab of the assembly. The assembly includes a divider sheet having a tab extending out of one edge and a reinforced binding edge flap. The divider sheet can be manufactured from ink jet receptive top-coated white cardstock. A guide strip along the tab edge assists the assembly being fed and passing through the printer despite the presence of the tab. The binding edge flap is folded over onto the body of the sheet and held thereon to reduce the width dimension of the assembly so that it can be fed into and passed through the printer. After passing through the printer, the guide strip is removed and the flap is unfolded. To improve feed of the assembly from a printer feed tray having corner guides, the flap is manufactured to have notches cut out of both ends thereof to define thin legs along the flap fold line and at both corner ends of the flap.

28 Claims, 7 Drawing Sheets

METHOD OF MANUFACTURING AN INDEX DIVIDER SHEET ASSEMBLY

CROSS-REFERENCE TO RELATED APPLICATION

This is related to application Ser. No. 09/310,505, filed May 12, 1999, now U.S. Pat. No. 6,099,189, whose entire contents are hereby incorporated by reference.

BACKGROUND OF THE INVENTION

The present invention is directed to index sheets that are directly printable by machines such as ink jet printers. More specifically, it relates to constructions of index divider sheet assemblies, processes of manufacturing them and methods of using them. It further is concerned with methods of manufacturing tabbed sheets having fold-over binding edges for feeding into copiers and printers for printing operations thereon.

A popular index divider product that is printable by laser printers is the "DIRECT PRINT Custom Dividers for Laser Printers" product, which has been available from Avery Dennison Corporation of Pasadena, Calif. since 1998. It has an index tab extending out from a tab edge thereof and an opposite binding edge flap, which is calendered and folded over onto the adjacent calendered portion of the body sheet and held down with a releasable adhesive. By folding the flap over and tacking it down, the effective width of the product is reduced so that it can be fed into today's printers or copiers.

An adhesive peel-off strip is adhered to the backside of the sheet along the tab edge and behind the tab of the DIRECT PRINT product. Thereby, the strip defines a straight edge perimeter for the product, improving feeding of the product into and/or passing of the product through a printer or copier. The strip is then peeled off of the sheet after the printing operation and disposed of. This product is disclosed in U.S. Pat. No. 5,743,566 ('566) (Hunter et al.) and U.S. Pat. No. 5,792,297 ('297) (Hunter et al.). See also, U.S. Pat. No. 5,558,454 (Owen) and U.S. Pat. No. 5,836,710 (Owen). (These four patents and all other patents and other publications mentioned anywhere in this disclosure are hereby incorporated by reference in their entireties.) Additionally, see PCT Publications WO 98/07582 and 98/41406, both by ACCO USA, Inc.

The DIRECT PRINT product can thereby be fed in a portrait direction into laser printers, and the peel-off strip creates a rectangular sheet article which provides a continuous edge to run through the printer. When it is fed into tabloid-size ink jet printers that are designed to print eleven inch by seventeen inch sheets in a landscape orientation, it is fed binding edge first. This insures proper feeding because if it were fed peel-off strip edge first, the tab edge may catch in the printer.

For some of the tabloid-size laser printers when the product is fed in the landscape direction, peel-off strip last, the peel-off strip helps the printer correctly sense the edge of the sheet. That is, without the strip the edge of the sheet would be sensed about one half inch early, and once the sensor is triggered the printer does not print, and thus will not print on the tab. Examples of these printers are the HP 4V, 5SI and the Mopier printers from HP.

When the DIRECT PRINT product is fed in the portrait direction from feed trays in many ink jet printers, the sheets are not reliably picked up and fed into the printers. This is particularly true for the HP DeskJet 500C, DeskJet 1200C, DeskJet 1600C and Lexmark printers, and also the Canon Bubble Jet printers and Epson Stylus Color printers. These feed trays have corner separation tabs, which have a height of about one-quarter inch; more specifically, they are about three-sixteenths inch wide and one-quarter inch deep. The tabs are provided to separate the top sheet off of the rest of the stack for individual feed into the printer. Unfortunately, the DIRECT PRINT product hangs up at its folded-over flap on these clips or tray corner tabs of ink jet printers.

SUMMARY OF THE INVENTION

Directed to remedying the problem of the DIRECT PRINT product feeding from certain feed trays having corner separation tabs, an improved index divider sheet assembly is disclosed herein. The assembly similar to the prior art product has a main body sheet having a tab extending out of a tab edge thereof. A binding edge flap is folded (on a score line) over onto the body of the sheet along a binding edge opposite to the tab edge, and held in the folded-over position with releasable adhesive. A peel-off strip is attached to the body along the tab edge and extending out therefrom to a distance slightly beyond that of the tab. The strip thereby "squares" off the tab edge, so that it is straight with no protrusions. The strip assists the proper functioning and printing of the printer on the divider sheet. The strip is peeled off of the divider sheet by the user after the printing operation.

The binding edge strip according to a preferred embodiment of the invention is reinforced with a reinforcing strip. The binding edge strip is provided for securing the sheet together with other sheets in a book-like arrangement. One way of doing this is to form binder ring holes in the strip; another way is to provide a series of small rectangular holes for a comb binding system; and a third way is to glue (with heat-activated adhesives) the strips to similar strips on similar sheets and to document sheets in a stack in a thermally bound report.

A disadvantage of these strips is that they extend the effective width of the sheet. They extend it about an inch, which makes the sheet too wide to be fed in a portrait direction into most printers and copiers. Accordingly, the strip is folded over onto the body of the sheet and held there with releasable adhesive, as mentioned above. Then after the sheet assembly has been fed into and passed through the printer or copier, the flap is unfolded to a flat orientation with the divider sheet.

Pursuant to the present invention, the flap has notches cut out (either die cut or hole punched) of opposing end corners with a thin "leg" formed at the corners and along the flap fold line. The legs are narrower than the width of the body portion of the flap. These thin legs, which fit under the corner clips in the printer/copier feed trays, allow the assemblies to be individually picked up and fed off of a stack of same in the feed trays into the printer/copier. Thus, another definition of the invention is a laser printer feed tray with the corner clips and one or a stack of these assemblies (with the fold-over flap which has the thin legs) in the tray. The present assembly can be fed in a portrait direction into an ink jet printer. It can also be fed in a landscape direction into that printer. However, it would be fed binding edge first and the legs may help reduce stiffness of the corners. The legs may also help the divider assembly feed out of a laser printer cassette tray.

The depth of the notch may be any depth greater than $3/16$ inch, and preferably is $3/8$ inch. The width should be such that a thin area ($1/16$ inch nominal) is left to the outside of the score line. This extra material allows for the accurate folding of the sheet in the fold-and-glue machine discussed below. Although there should be a two-ply area along the edge, the thinner it is the better. The two-ply area should be substantially narrower than the width of the corner separation tabs (less than 3⁄16 inch) to facilitate feeding of the assembly into a printer or copier. The notch cut and leg form a single thick area that reduces the overall stiffness at the corner. The double-thick area along the edge provides a smooth edge to slide over the corner tabs. If the product were notched to the edge, the interface between the single and double thickness would likely tend to catch in the printer. Furthermore, the extra material allows for easier folding of the binding edge.

The assembly can be manufactured using a nine-and-a-quarter inch wide roll of paper coated with an ink jet receptive coating, with a hydrophobic backside coating for moisture stability and to enable release of the adhesive strip. Also, the roll of paper can be uncoated on the back side to facilitate release of the adhesives. (The release coating is used if the paper is not properly moisture balanced and therefore curls.)

The paper is processed by several in-line steps. One step is that it is calendered to reduce its thickness in the binding area by up to twenty percent. The calendered area is scored vertically down the middle thereof. The paper is turned over and a reinforcing strip of polyester is applied to the flap area. The paper is slit to a nine inch width, the holes are punched, the paper is notch-punched and the paper is sheeted to eleven inches. The polyester strip may be spaced about 1⁄32 inch from the score (fold) line. Thus, the polyester strip longitudinally coats about half of the thin legs.

The sheets are then processed through a tab cutting machine where a patch of ink jet receptive coated MYLAR is applied to the tab side and the tab shape is cut out. The tabbed sheets are then processed through a fold-and-glue machine that applies the peel-off strip to the back side of the sheet, applies a fugitive adhesive to the hole-punched binding edge, folds the binding edge over and laminates the fold together. More particularly, the fold-and-glue machine performs the following manufacturing steps: a first aligner straightens the sheet; the peel-off strip is applied; Swift adhesive is Gravure printed onto the sheet; the flap is held by feeding into a narrowing V-shaped channel; and the binding edge is held in place with pressure rollers while the adhesive dries.

Alternative manufacturing processes of the invention include conducting the notching step "off line" in a discrete operation after the reinforcing and hole punching steps. Instead of punching and slitting the notch, it can be die cut. Slitting to size is optional and can be done after the notching step, if desired. Many of the steps in the two paragraphs above can be rearranged, as would be apparent to those skilled in the art. Additionally, the tab need not be MYLAR-reinforced.

Thus, the notch cut can be formed in-line with punch/die sets on a (SUPERWEB) converting press. Alternatively, it can be formed by a discrete sheet-fed die-cut operation. A further alternative is to form it in a continuous web die cutting and matrix removal system.

Preferred dimensions for the overall sheet when unfolded are nine by eleven inches, with a one-half inch tall tab area. The folded product with the peel-off strip preferably measure 8.5 by eleven inches. The scored and folded area is ¾ inch wide with a 1.5 inch wide calendered area. Although the peel-off strip is 1-7⁄16 inch wide, it can vary as the total width dimension is 8.5 inches.

Other objects and advantages of the present invention will become more apparent to those persons having ordinary skill in the art to which the present invention pertains from the foregoing description taken in conjunction with the accompanying drawings.

Figure 2:
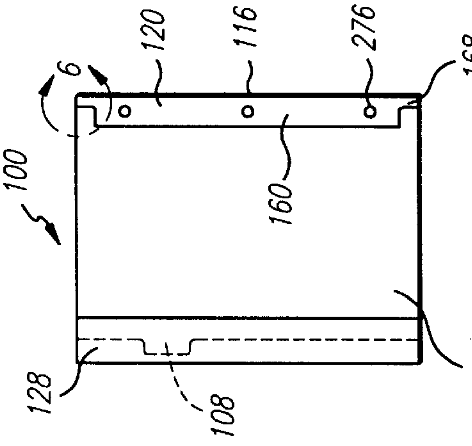
FIG. 2 is a rear plan view thereof.
Figure 1:
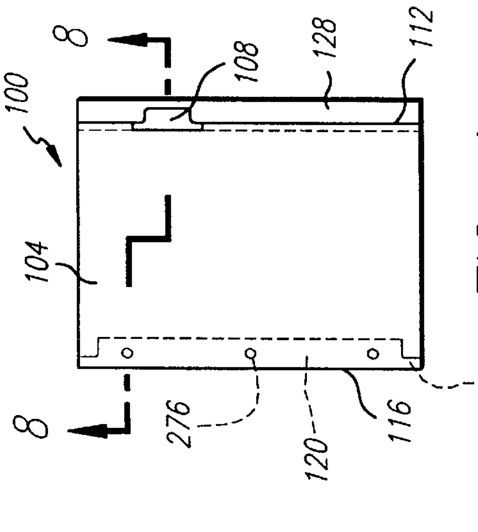
FIG. 1 is a front plan view of an index divider sheet assembly of the present invention.
Figure 6A:
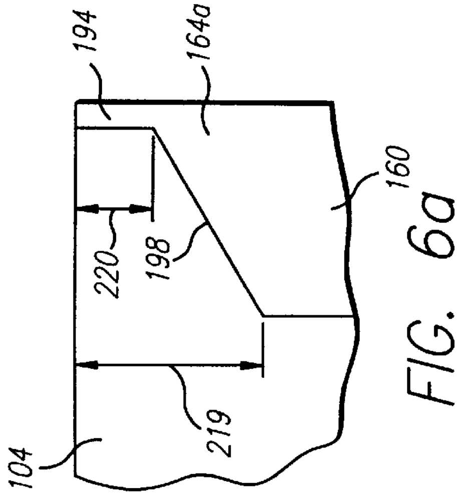
FIG. 6 is an enlarged view taken on circle 6 of FIG. 2 and showing a preferred notch-cut configuration.
Figure 6D:
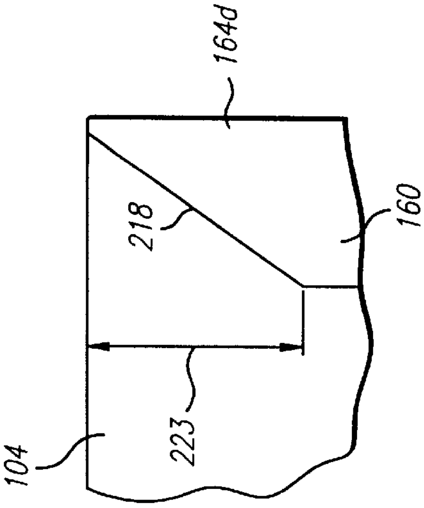
Figure 6:
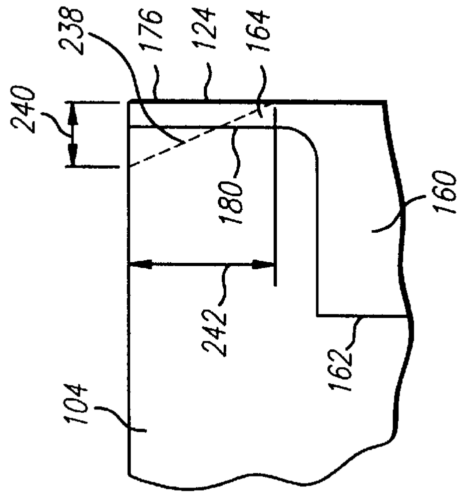
Figure 6C:
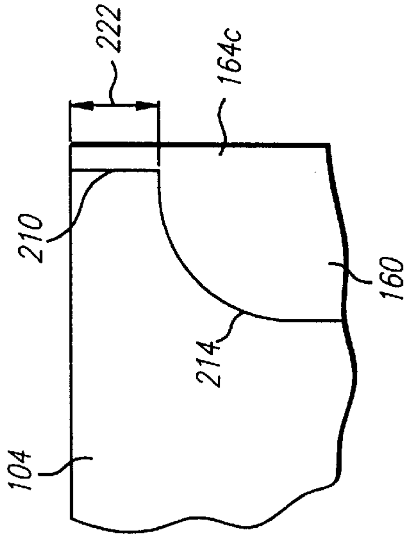
Figure 5:
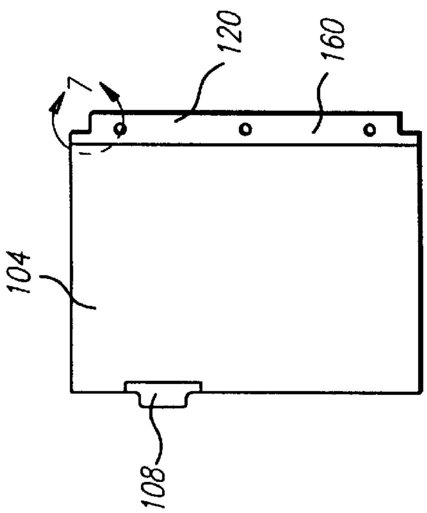
FIG. 5 is a rear plan view of the assembly of FIG. 4 after the unfolding and unpeeling steps.
Figure 6B:
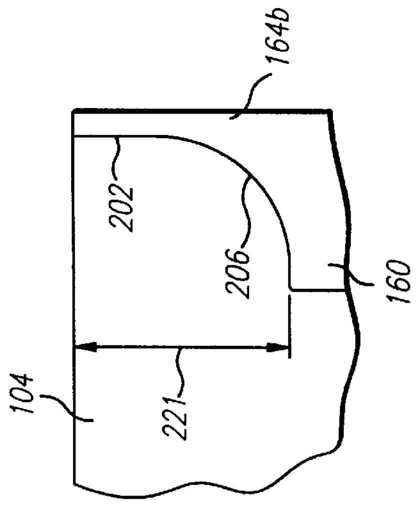
Figure 7:
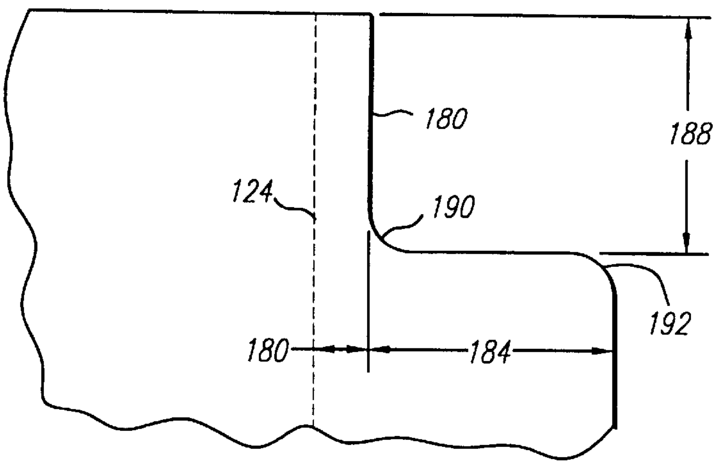
Figure 8:
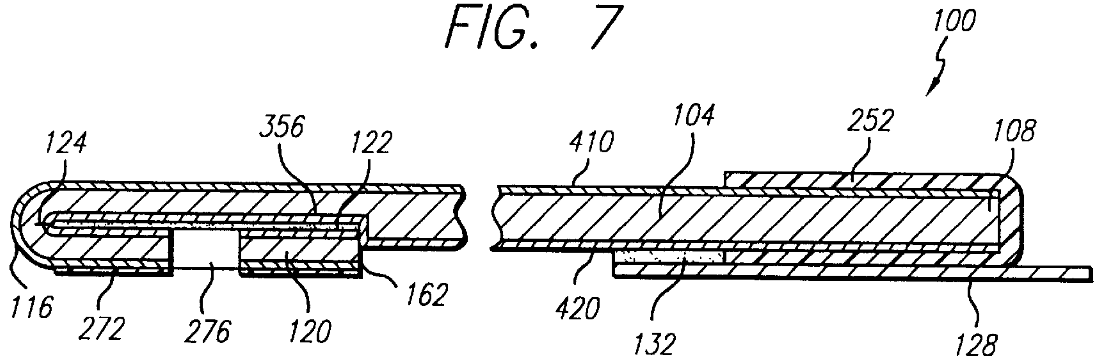
Figure 9:
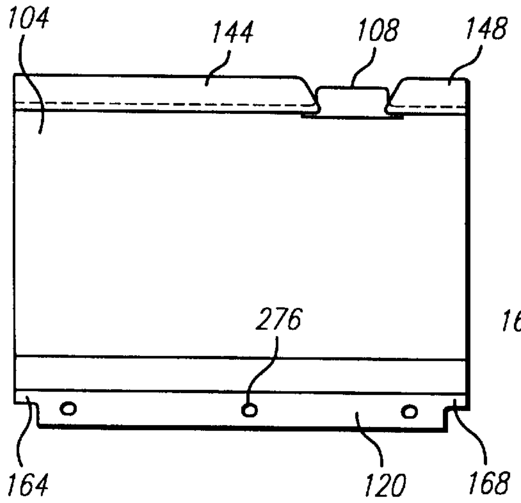
Figure 10:
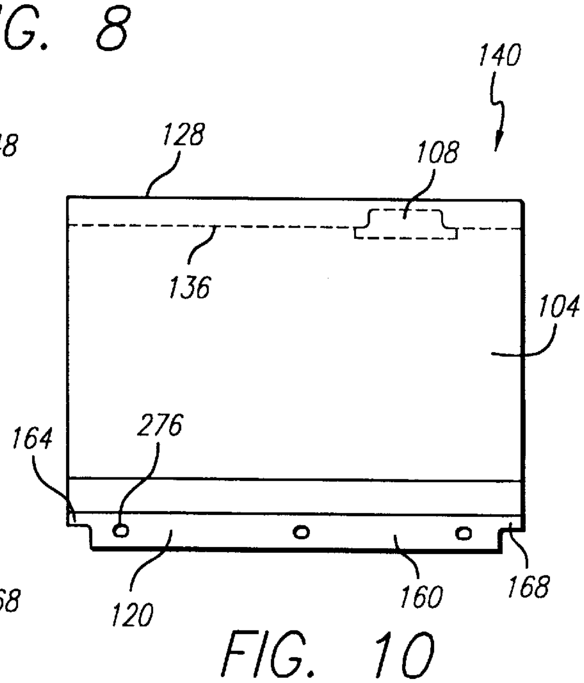
Figure 11:
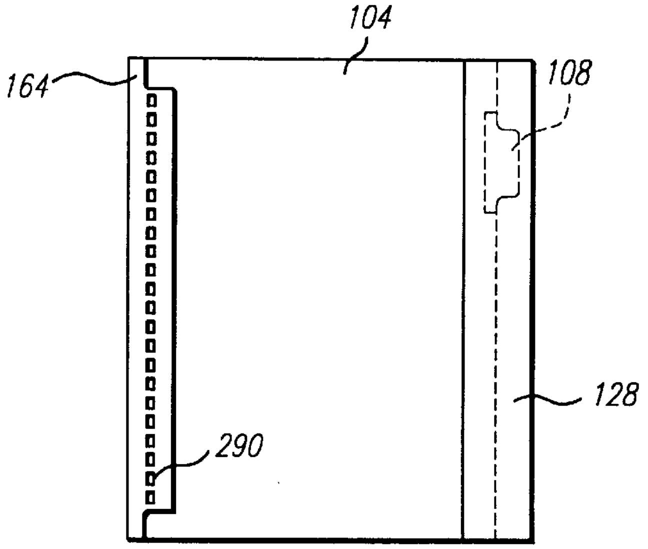
Figure 12A:
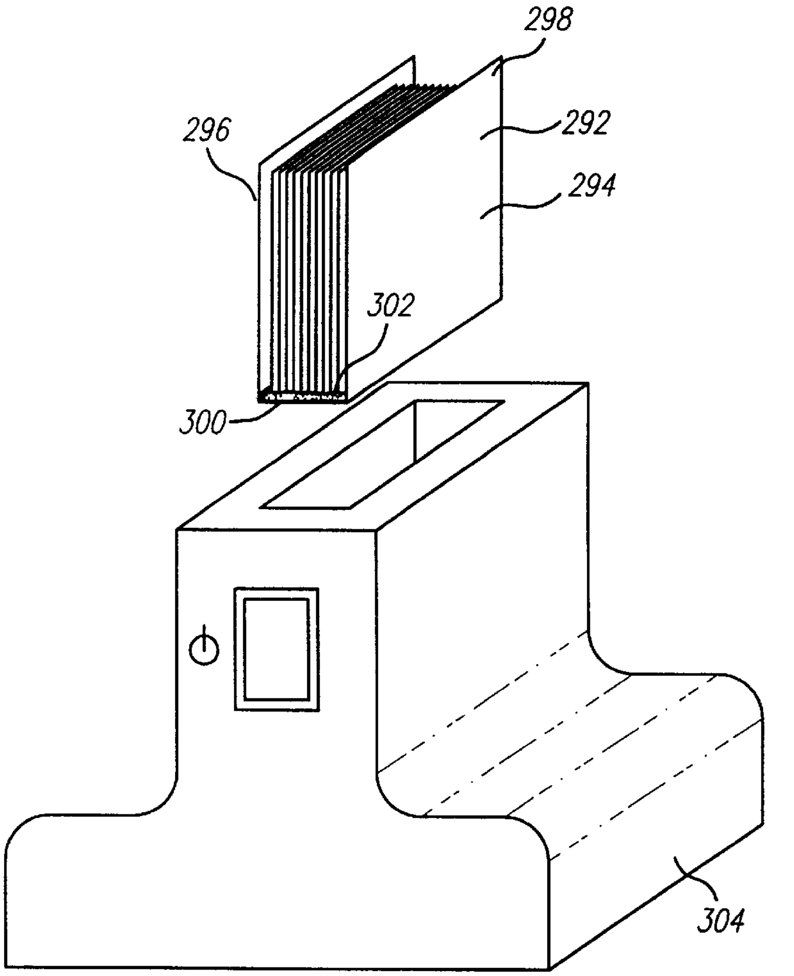

FIG. **6*a* is a view similar to FIG. 6** showing a first alternative configuration thereof;

FIG. **6*b*** shows a second alternative configuration;

FIG. **6*c*** shows a third alternative configuration;

FIG. **6*d*** shows a fourth alternative configuration;

FIG. 7 is an enlarged view taken on circle 7 of FIG. 5;

FIG. 8 is an enlarged cross-sectional view taken on line 8—8 of FIG. 1;

FIG. 9 is a rear plan view of an index divider sheet assembly of the present invention showing a first alternative removable guide strip;

FIG. 10 is a view similar to FIG. 9 showing a second alternative removable guide strip;

FIG. 11 is a view similar to FIG. 2 showing a first alternative binding edge flap;

FIG. **12*a*** is a perspective view of an alternative binding assembly showing index divider sheet assemblies of the present invention (and document sheets) being bound together in a report form in a thermal binding machine;

FIG. **12*b* is an enlarged perspective view of an inside portion of the spine of the binding assembly of FIG. 12*a*;**

Figure 14:
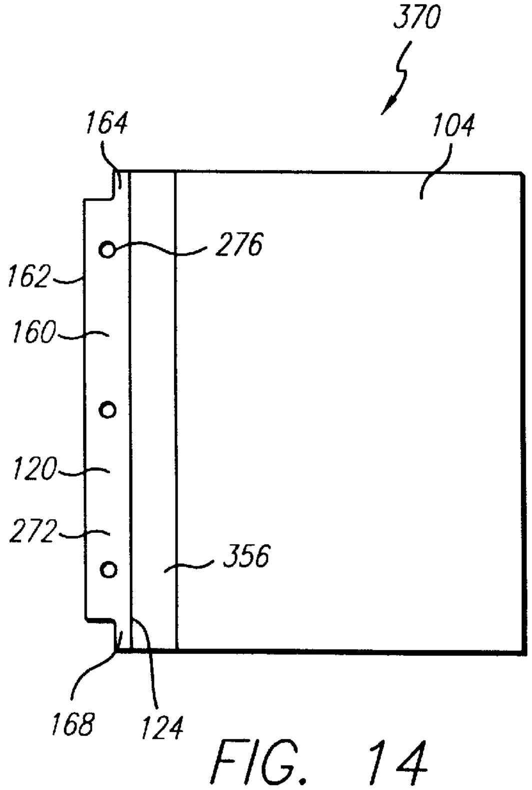
Figure 15:
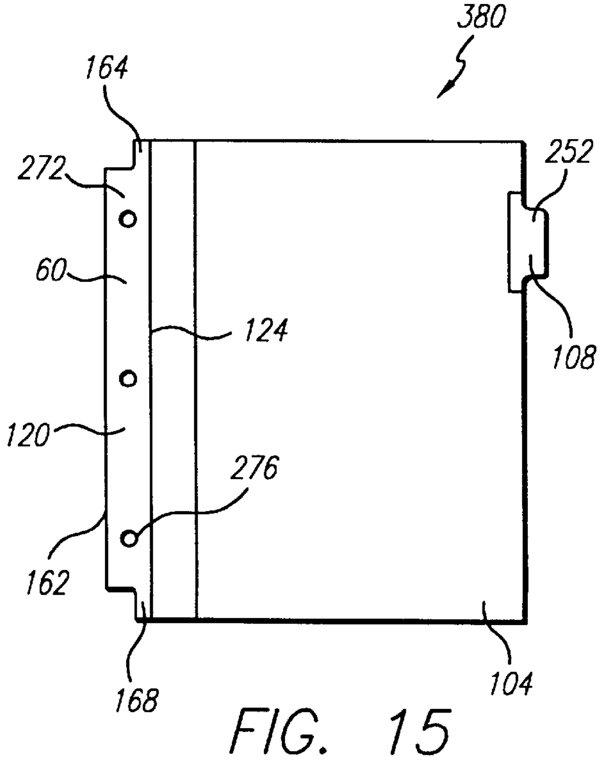
Figure 12B:
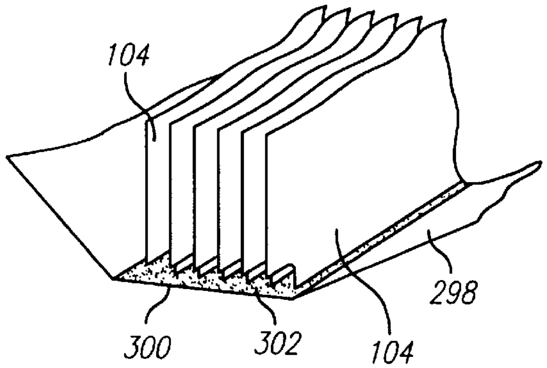
Figure 13:
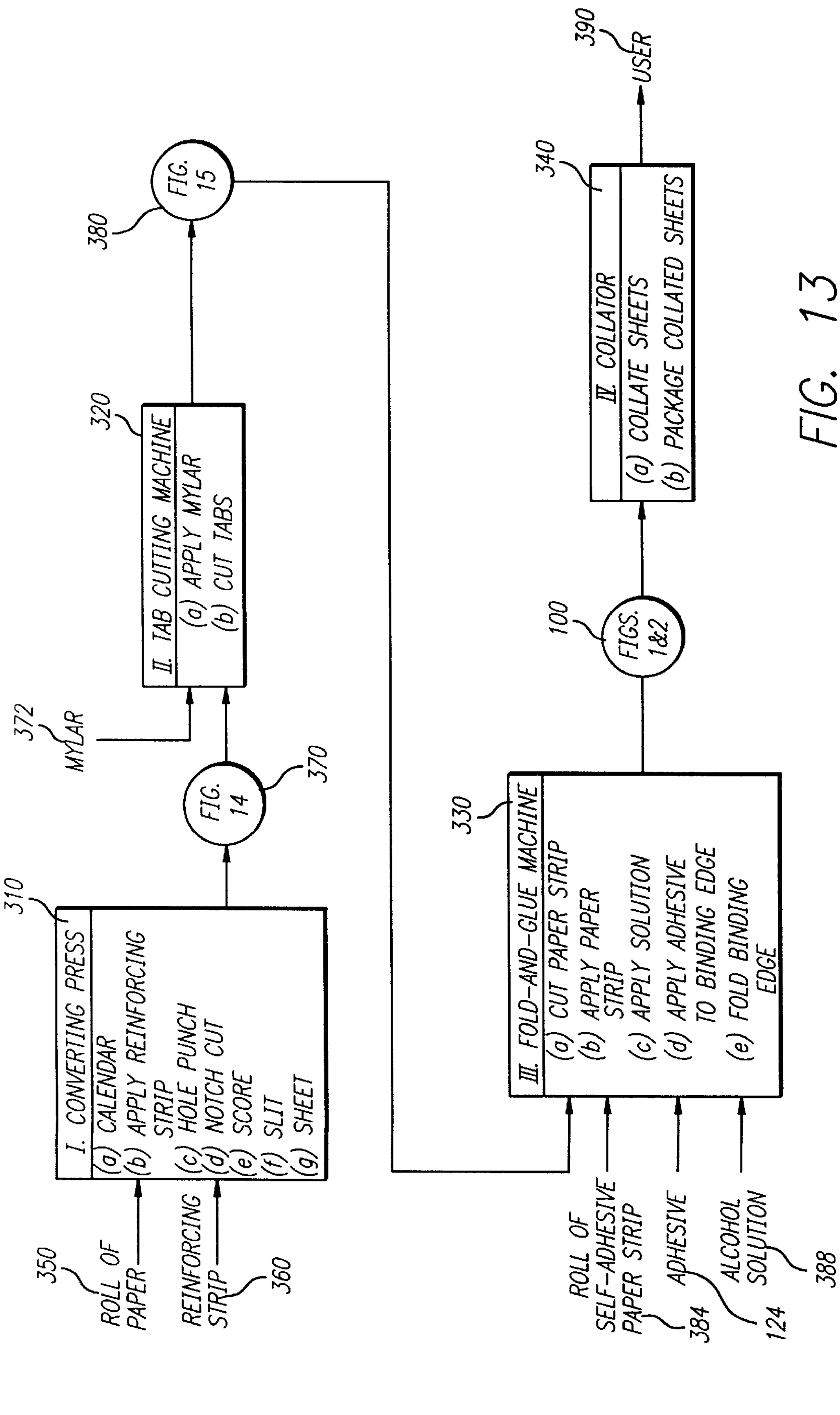
Figure 16:
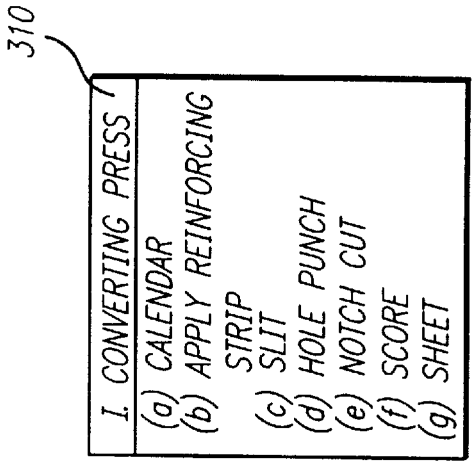
Figure 17:
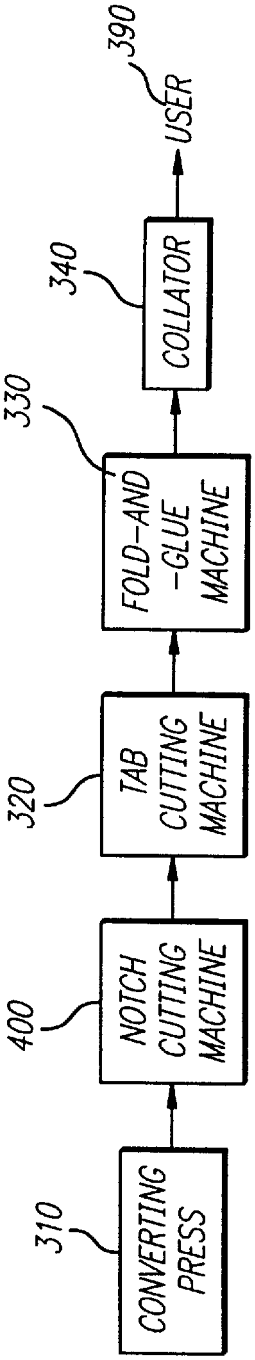

FIG. **12*c* is an end elevational view, similar to FIG. 12*b*,** showing the adhesive attachments of sheets to the spine;

FIG. 13 a flow chart showing a process for manufacturing the assembly of FIG. 1, for example;

FIG. 14 is a plan view of the assembly at a first intermediate manufacturing step thereof as shown in FIG. 13;

FIG. 15 is a plan view of the assembly at a second intermediate manufacturing step thereof as shown in FIG. 13;

FIG. 16 shows an alternative order of the steps in the converting press of FIG. 13; and FIG. 17 is a flow chart showing the equipment used in an alternative manufacturing process of the present invention.

DETAILED DESCRIPTION OF PREFERRED EMBODIMENTS OF THE INVENTION

A preferred index divider sheet assembly is shown in isolation and ready for feeding into a printer or copier (FIG. 3) generally at 100 in FIGS. 1 and 2. The assembly includes a divider paper sheet 104 having a tab 108 extending out from a tab edge 112 thereof. Opposite the tab edge 112 is a binding edge 116 of the sheet 104. A binding edge flap 120 folds along the binding edge 116 and is releasably secured with adhesive 122 (FIG. 8) to the back body portion of the paper sheet 104 in a folded-over position as shown in FIGS. 1 and 2, for example. Preferably, the binding edge flap 120 and the sheet 104 are formed from a continuous sheet material (see FIG. 13) and a score line 124 (FIGS. 14 and 15) on the sheet material defines the binding edge 116.

A paper guide strip 128 is attached with releasable adhesive 132 to the back side of the paper sheet 104 along the tab edge 112. The strip 128 preferably extends a small distance past the outer edge of the tab 128 whereby the strip defines a straight edge of the assembly 100. The guide strip 128 is preferably 1-7/16 inches wide, twenty pound uncoated bond paper available from Moore Business Forms and the adhesive 132 is CLEAN TAC I ultraremovable adhesive, 3.6–3.9 mil thick, with a one-half inch wide gummed area.

As explained in the '566 and '297 patents, the strip 128 assists in feeding the assembly 100 into and/or transport through a printer and/or copier. Instead of attaching the strip 128 to the sheet 104 with adhesive 132, it can be attached using a line of microperforations 136, as shown by assembly 140 in FIG. 10. That is, a microperforation line 136 is formed in a paper sheet to define on one side of the line the paper sheet 104 including the tab 108, and on the other side the strip 128 is defined.

Figure 4:
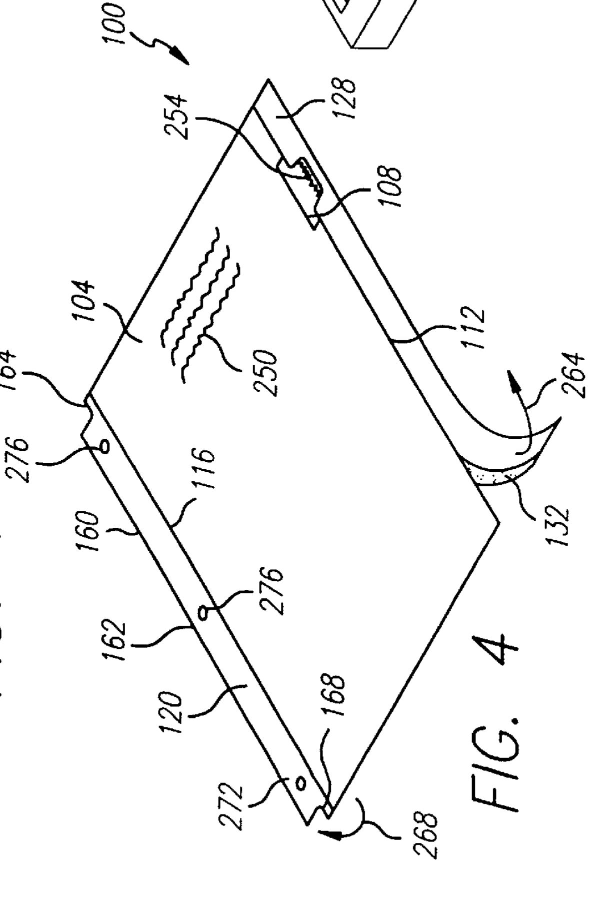
FIG. 4 is a perspective view of one of the assemblies of FIG. 1, after a printing operation thereon such as by the printer of FIG. 3, and showing flap unfolding and strip unpeeling steps thereon.

The adhesive guide strip 128 of FIGS. 1 and 2, for example, covers the entire back side of the tab 108. Therefore, with the guide strip 128 in place and the assembly 100 fed into the printer or copier, the back side of the tab 108 cannot be printed on; only the front face can be printed on as shown in FIG. 4. Accordingly, an alternative guide strip configuration of the present invention is provided and illustrated in FIG. 9. FIG. 9 shows that the guide strip can be formed by two guide strip portions 144, 148. The guide strip portions 144, 148 are attached with adhesive (132) to the back of the sheet 104 and along the tab edge 112. Both extend from opposite ends of the sheet 104 towards the tab 108 and to the adjacent edge of the tab. Neither, however, crosses the back face of the tab 108. Thereby in addition to the front face of the tab 108, the back face thereof is exposed and accessible for a printing operation thereon with the embodiment of FIG. 9.

The binding edge flap 120, as depicted for example in FIGS. 2 and 6, includes a body portion strip 160, preferably having parallel side edges. One of edges is formed by the fold line 124 or the edge of the body sheet and the other edge is defined by the edge 162 of the sheet material. The body portion strip 160 extends a substantial length of the sheet, but is spaced from the top and bottom edges by top leg 164 and bottom leg 168. The legs 164, 168 preferably have the same configuration and dimensions, so only one (the top leg 164) will now be discussed in detail. However, it is within the scope of the present invention to configure and/or dimension the two legs 164, 168 differently, or to omit one altogether. By omitting one altogether, the body portion strip 160 would then preferably extend to the edge of the sheet 104 at the end of the omitted leg; alternatively, the end of the strip 160 can be spaced from the end.

Figure 3:
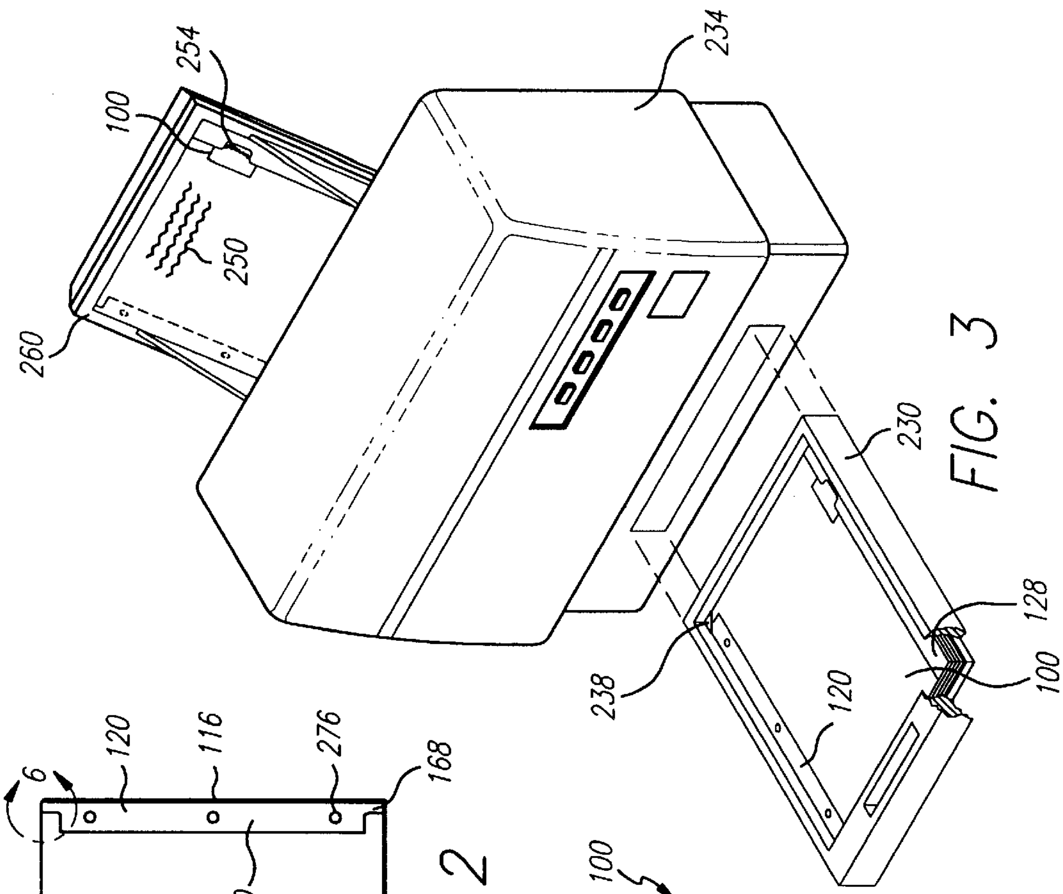
FIG. 3 is a perspective view of an ink jet printer showing a stack of the index divider sheet assemblies of the present invention in the feed tray thereof.

A preferred design of leg 164 has one edge 176 thereof being defined by the fold line 124, and thus being straight. The other edge 180 is also straight and parallel to the one edge 176. This is shown in enlarged view in FIG. 6 with the binding edge flap 120 in a folded-over position wherein the assembly 100 is ready for feeding into a printer or copier (FIG. 3). It is also shown in an enlarged view and in an unfolded position (after a printing operation and ready for use) in FIG. 7. Referring thereto, preferred dimensions 180, 184 and 188 are 3/32, 21/32, and 3/8 inch, respectively, with 1/16 inch rounded corners 190, 192.

FIGS. 6*a* to 6*d* show alternative configurations for the leg. Each of the legs along top edges of each of FIGS. 6*a*–6*d* has a width of 1/16 inch, preferably. All have the outboard edge ("outboard" when the flap 120 is in the folded-over position and "inboard" when the flap is in the unfolded position) as being straight and defined by the fold line 124. Leg 164*a* (FIG. 6*a*) on the opposite edge has a short parallel straight portion 194 and a diagonal portion 198. Alternative leg 164*b* (FIG. 6*b*) on the opposite edge has a short parallel straight portion 202 and a concave portion 206. Alternative leg 164*c* (FIG. 6*c*) on the opposite edge has a short parallel straight portion 210 and a convex portion 214. And referring to FIG. 6*d*, alternative leg 164*d* on the opposite edge thereof does not have a short parallel straight portion, but rather has a straight diagonal edge 218. Referring to FIGS. 6*a*–6*d*, preferred dimensions 219, 220, 221, 222 and 223 are 3/4, 1/4, 3/8, 3/8 and 3/4 inch, respectively.

Other configurations, such as replacing straight edge 218 with a concave, convex or other curving edge, are also within the scope of the invention. However, the embodiment of FIG. 6 appears to be preferred over those of FIGS. 6*a*–*d* because it has the largest single-thickness area. This provides the lowest stiffness and thereby the greatest sheet flexibility to enhance feeding.

Thus, with the assembly 100 in an automatic feed tray 230, as shown in FIG. 3, of a printer or copier shown generally at 234, the cutaway portion (the notch portion of the flap cut away to form the leg 164) or notch is under the clip 238; that is, the clip is over the leg 164 and the cutaway portion. Examples of printers 234 are the Canon Bubble Jet printers, the Epson Stylus color printers and the HP1200C and 1600C printers. The assemblies 100 efficiently individually feed from the tray 230 without getting caught up on the clips 238. The clips 238 have dimensions 240, 242, as shown in FIG. 6, of one-eighth and one-quarter inch, respectively. The printer or copier 234 then prints on the sheet of the assembly 100 as directed by the software, on the body of the sheet 104 as shown by indicia 250 in FIGS. 3 and 4 and/or on MYLAR film 252 on the tab 108 as shown by indicia 254. And the assemblies 100 with the desired indicia printed thereon are output into the output tray 260 of the printer or copier 234 for removal therefrom by the user.

The effectiveness of the present assembly 100 was demonstrated in recent tests. The assembly 100 with leg 164 having dimensions of 1/8 inch by 1/4 inch was tested against the prior art DIRECT PRINT product as discussed earlier. One test used an HP DeskJet 1200C printer and tested for "major problems" wherein the product is damaged so as to be unusable or undesirable and for "minor problems" wherein although there is a feed problem, the product is not thereby damaged. For the prior art product using this printer, there were eight major skewing errors, four major infeed jams and eight minor misfeeds for the five hundred sheets which were tested. In contrast, for the assembly 100, there was only one major infeed jam for the five hundred sheets.

The other test used an HP DeskJet 1600C printer. For the prior art product, only sixty (and not five hundred) sheets were tested, and there were five major infeed jams, two major misfeeds and three minor misfeeds. In contrast, for the assembly 100 for five hundred sheets tested, there were only fourteen major infeed jams.

After the printing operation the user removes the printed assemblies 100 from the output tray 260. Referring to FIG. 4, he peels the guide strip 128 from off the back of the body sheet 104 as shown by arrow 264. He also pulls on the flap 120, breaking the adhesive 122 holding it to the body sheet 104 and unfolds the flap as depicted by arrow 268 about fold line 124 until it is flat with the body sheet. The flap 120 preferably has a reinforcing strip 272 on it. With ring binder holes 276 punched in the flap 120, the reinforcing strip 272 reinforces the flap and holes, preventing the flap from tearing at the holes.

Instead of attaching the sheets via their binding edge flaps 120 in a ring binder (not shown) using the binder holes 276, an alternative arrangement forms a series or row of small rectangular holes, such as shown in FIG. 11 at 290, for securement of the sheet assemblies in a comb binding system.

A further alternative attachment system is shown in FIG. 12*a* by thermal binding assembly 292, which in essence is a thermally-bound report using the present divider sheets 104 and report sheets 293 therebetween. Assembly 292 includes a cover assembly 294, which is formed by a front cover sheet 296, a back sheet 298 and a spine 300 therebetween. The back sheet 298 and the spine 300 can comprise a single piece of paper, and the two cover sheets 296, 298 are laminated together to form a continuous U-shape, as can be understood from FIGS. 12*a* and 12*b*. The back cover sheet 298 can be an opaque heavy paper with a clear plastic cover attached to the front surface thereof.

Figure 12C:
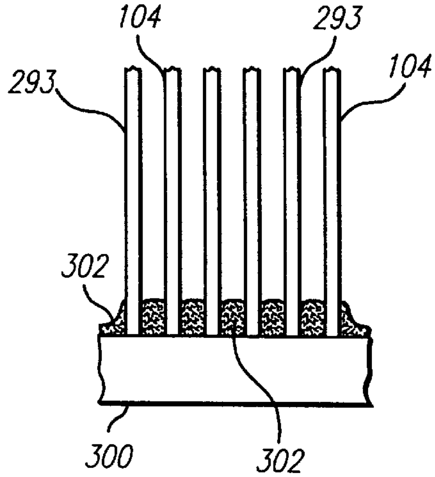

The divider sheets 104 and report sheets 293 are held to the spine 300 with adhesive 302. The adhesive 302 is similar to a hot glue, which melts when heated and solidifies and binds when cooled. Referring to FIG. 12*c*, the adhesive 302 is originally a bead about one sixty-fourth to one thirty-second inch "tall." After melting, it oozes between the pages, but stays roughly one thirty-second inch tall. It is melted in a thermal binding machine shown generically at 304 in FIG. 12*a*. An example of the machine 304 is the AVERY FIRST IMPRESSION Desktop Bindery system, which uses FIRST IMPRESSION report covers. And another example is the DURABIND system available from Ibico. In other words, the report cover with document and tabbed divider sheet pages is inserted into the thermal binding machine 304. The machine heat activates the adhesive 302, which softens and permanently binds the pages contacting the adhesive to each other and the cover assembly 294.

As discussed further later, a usable paper for the sheet 104, tab 108 and flap 120 is REXAM's CX4 two-sided coated ink jet paper, one hundred and thirty grams per square meter, ninety Sheffield face, one hundred and fifty to two hundred Sheffield back side, and about six mils thick. A Sheffield smoothness of one hundred and fifty to three hundred to help feeding is preferred. It is also within the scope of the invention to use a flat sheet with coating on only one side. An alternative paper is the Monadnock two-side coated ink jet paper, such as the Monadnock Coated Vellum Finish/Bright White—Grade CP653-089 paper.

In general, the ink jet receptive coating on the paper will make the surface of the paper smoother. Ink jet coatings are normally applied in a fairly thick layer of solution. The layer will naturally fill the pores of the paper surface providing a uniform surface. The roughness of the surface is then a result of the inherent roughness of the coating. Accordingly to one embodiment of the present invention, the ink jet coatings can be designed to have "rough" properties on the front and to comprise very thin layers on the back to maximize the roughness of the paper.

Process steps and equipment used in manufacturing assembly 100 will now be described with reference first to FIG. 13. Four pieces of equipment are illustrated therein for use in manufacturing the assembly 100. The first is a converting press 310, such as the SUPERWEB 860—20-½ press. The second is a tab cutting machine 320, such as the Scott 10,000 Tab Cutter. The third is a fold-and-glue machine 330, such as a custom-made Ga-Vehren fold-and-glue machine. And the fourth is a collator 340, such as the Bourg Modulen Collator (Conveying Unit Model): UT MKS; Module Stations; Module "S"; and Feeders (where needed); Models 3H and BG.

A roll of paper 350, as depicted in FIG. 13, is inserted into the converting press 310. The paper 350 can be nine inch wide paper or nine-and-a-quarter inch wide to accommodate manufacturing tolerances. The first step is that a binding region 356 on the back side of the paper is calendered. The binding region 356 includes where the flap (120) will be formed and the adjacent strip of the body sheet where the flap abuts when in the folded-over position. It is calendered approximately twenty percent or from about six mil down to about five mil, as can be understood from FIG. 8. This reduces the stiffness and thickness of the assembly 100 at the folded-over area to improve feeding into the printer. The calendering is process step I(a) in the converting press 310.

Process step I(b) includes applying the reinforcing strip 272 to the paper on the front side on the "flap" area. The reinforcing strip 272 is preferably a strip of polyester material applied from a roll 360 using heat-sealed adhesive. The reinforcing strip 272 reinforces the holes 276. Process step I(c) in the converting press 310 slits the paper to the desired, exact nine inch width. And the holes 276 are then punched in step I(d).

The next process step (step I(e)) cuts the notches out of the corners of the sheet in a hole-punch type of process The sheet is then scored to form the fold line 124, pursuant to step I(f). And the sheet is then sheeted in step I(g) to a length of eleven inches. (Other length (and width) dimensions can be used as desired, including for example, an A4 sheet or an 8-½ by fourteen inch sheet.) The product at this first stage of the manufacturing process is illustrated in FIG. 14 generally at 370.

The first stage product 370 is then delivered to the tab cutting machine 320. At machine 320 a two-and-a-half inch long rectangular strip of MYLAR 252 from a roll 372 is cut, folded over and heat sealed to both faces of the sheet body at the desired location of the tab 108 on the end product assembly 100. The strip length varies depending on the number of tabs. For example, while two-and-a-half inch works for a five-tab embodiment, an eight-tab would be substantially shorter. The sheet is then cut to define the shape of the tab 108. The second stage product (as shown generally at 380 in FIG. 15) from the tab cutting machine 320 differs from the first stage product 370, as can be seen from a side-to-side comparison of these two drawings, in that the MYLAR film 252 has been added and the tab 108 cut out. The second stage product 380 is then transported to the fold-and-glue machine 330.

Referring back to FIG. 13, the adhesive guide strip 128 is cut (step III(a)) from a self-wound roll of ultra-removable self-adhesive paper strip 384 to a length a little less than eleven inches. The strip can be a twenty-pound uncoated bond paper available from Moore Business Forms. And the adhesive 132 can be the CLEAN TAC I ultra-removable adhesive available from FASSON, and which is applied to the back of the sheet (the second stage product 380) along the tab edge. The strips 128 are held on a vacuum roller of the fold-and-glue machine 330, which applies them to the sheets as the sheets roll underneath them. A thin solution of alcohol 388 (seventy-five percent alcohol and twenty-five percent water) is applied to the score line 124 to make it more pliable, which is step III(c). The alcohol solution is applied to the score line in a continuous stream using a pressurized system with a solenoid valve and control system. More particularly, the application device uses a thin hypodermic needle positioned one-half inch above the sheet path.

Before step III(b) and after the second stage product 380 has been fed into the fold-and-glue machine 330, the paper product is aligned. It is aligned using aligner equipment. This equipment preferably includes a "datum rail" against which the sheets are pushed. A chain-geared system and angled ball bearing guide are used to push the sheets up against the rail.

Step III(d) comprises applying dry tack or fugitive adhesive 122 to the backside of the flap 120; (alternatively, it can be applied to the (calendered) binding region of the back side of the sheet adjacent to the flap). The fugitive adhesive is applied on the body part of the divider with a gravure flexoplate. A preferred adhesive 122 for the binding edge is Swift 45992 Resins PVA water-based fugitive adhesive. However, generally any dry-tack or fugitive adhesive can be used. The flap 120 is then folded onto the back side of the paper to the folded-over position. More particularly, step II(e) includes running the second stage product 380 through a V-shaped channel that forces the paper into a folded condition and then it is pressure laminated down, and thereby into the folded-over position. The legs 164, 168 are preferably not glued down, only the body portion 160 of the strip is glued because the equipment does not easily allow applying glue on such a thin area. However, it is also within the scope of the invention to glue the legs if it can be efficiently done.

The product is then removed from the fold-and-glue machine 330, and it is in a final condition as shown in FIGS. 1 and 2 by assembly 100. It can then be loaded into the feed tray 230 of the printer or copier 234 and passed therethrough for a printing operation thereon. However, as a practical commercial matter, it is first transported from the fold-and-glue machine 330 to the collator 340. It is therein collated pursuant to step IV(a) into a set of assemblies. In the tab cutting machine 320 the tabs 108 are cut in one of five or eight different staggered positions along the tab edge of the sheet. The different positions are selected so that a stacked set of different tab position assemblies 100 has the tabs 108 thereof staggered in a known fashion so that all are readable when in a ring binder, for example.

Thus, the assemblies 100 are collated into respective sets. And the sets are then packaged in a known manner pursuant to step IV(b), as in transparent plastic packaging (not shown) with identifying indicia and instructions printed thereon and/or on a separate instruction sheet (also not shown) which is included in the package together with the set of assemblies (100) and then sealed closed. The packaged sets may then be boxed into cartons and then delivered to the ultimate user 390 through ordinary retail channels.

The process steps in the converting press 310 can be varied, for example, by moving the slitting process step I(f) of FIG. 13 so that it is between the reinforcing strip application step and the hole punching step, as shown by process step I(c) in FIG. 16.

A further alternative to the process of FIG. 13 (and the variation thereon of FIG. 16) is to not perform the notch cutting step I(d) of FIG. 13 in the converting press 310, but rather to transport the intermediate product to a separate notch cutting machine 400, as shown in block diagram form in FIG. 17. A preferred separate notch cutting machine 400 stamps the sheet with a plate that has sharp steel rules that cut out the notch shape (similar to a cookie cutter) . The two end notches will then be die cut out of the end corners of the flap in the notch cutting machine 400. In other words, the intermediate product which is delivered to the notch cutting machine 400 will have been subjected to process steps I(a), (b), (c), (e), (f) and (g) of FIG. 13 (or steps I(a)–(d) and (f) and (g) of FIG. 16). The product then from the notch cutting machine 400 will be the same as the first stage product 370, described above with reference to FIG. 14. The subsequent tab cutting machine 320, fold-and-glue machine 330 and collator 340 of the process of FIG. 17 will also be the same as in FIG. 13.

The leg 164 serves an important function in the folding step III(e) discussed above. The fold-and-glue machine 330 has a rail that catches where the score line should be. Thus, if the entire corner of the flap 120 (all of the way to the fold line 124) were notched out, the machine 330 would tend to catch on the top corner of the sheet. In other words, without the leg 164, the corner where the sheet transitions from single thickness to double thickness catches and holds the sheet in the tray 230, preventing it from being fed out. The leg 164 prevents the assembly 100 from catching as it is fed out of the tray 230. That is, the leg 164 provides the printer 234 with a continuous area, making the feed step smoother. The dimensions of the leg 164 are defined in substantial part by the location and dimensions of the corner separation tab or clip 238 in the printer feed tray. The height of the corner tab 238 is about one-quarter inch, so the leg 164 is preferably dimensioned to be a slight distance greater, three-eighths inch, for example.

The paper 350 can have a weight of one hundred and thirty grams plus or minus ten grams per square meter. It preferably should be thin enough (less than six or six and half mil) and flexible enough to feed through today's ink jet printers. The back side of the paper 350 should preferably have a fairly rough surface of at least one-hundred and fifty Sheffields or about one hundred and fifty to two hundred Sheffields. Sheets with a fairly rough back surface tend to slip less and thus feed better into printers.

The paper may have front and back side ink jet receptive coatings 410, 420 as shown in FIG. 8 (and which are not present in the prior art DIRECT PRINT product). Both sides are coated to prevent product curl. The back side 420 coating can be hydrophobic to assist the release of the water-based fugitive adhesive 122 of the flap 120 and the adhesive 132 of the peel-off strip 128 therefrom. It is made hydrophobic by adding an agent thereto wherein the agent modifies the coating 420 such that it counteracts the hydrophilic nature of the binders in the ink jet receptive coatings and enhances the release of ultraremovable adhesives and fugitive adhesives such as the resins-based PVA adhesive. This deadening agent thereby prevents the adhesives from being absorbed into the sheet and thereby aggressively adhering to the sheet. The paper 350 can come pre-coated with the deadening agent or it can be in-line coated on standard two-sided coated ink jet papers to facilitate release of the adhesives. It is also within the scope of the invention to coat the paper only on one side thereof.

One alternative embodiment of the present invention is that the flap 120 is formed separately and from a material different than that of the divider sheet and then attached thereto, such as disclosed in the previously-mentioned PCT publications. Also, the flap 120 can be constructed such that adhesive 266 is not used to attach it to the divider sheet 104 in the folded-over position. A further less preferred alternative is that the tab 128 is not integral with the sheet but is a separate element which is secured to the sheet 104 before or after the printing operation. Additionally, the tab 128 and/or the binding edge 120 flap can be at an end instead of a side of the sheet. A further alternative is to form the leg 164 by means other than cutting the notch out of the paper, as would be apparent to those skilled in the art from this disclosure.

Thus, it is evident from the foregoing detailed description that there are many changes, adaptations and modifications of the present invention which come within the province of those skilled in the art. For example, the present notch-cut invention can be applied to laminates, such as thick cardstock, where one calenders or removes some facestock to create the same single-think, double-thick pattern. It is intended, however, that all such variations not departing from the spirit of the invention be considered as within the scope thereof.

What is claimed is:

1. A manufacturing process, comprising the steps of:

(a) providing a sheet having a notch formed at a comer thereof at an end of a binding edge strip of the sheet;

(b) folding the binding edge strip onto a body of the sheet such that a leg at the notch and a body of the binding edge strip are folded over onto the body of the sheet, the leg having a width narrower than that of the body of the binding edge strip;

the notch being formed only on the binding edge strip; and wherein step (a) includes notch cutting paper from a roll and after the notch cutting, sheeting the paper into a sheet which includes the notch cut.

2. The process of claim 1 wherein the folding is on a fold line on the sheet, and the fold line defines a side edge of the leg.

3. The process of claim 2 further comprising forming a score line on the sheet, wherein the score line defines the fold line.

4. The process of claim 1 wherein step (a) includes applying a reinforcing strip to the binding edge strip before the notch cutting.

5. The process of claim 1 further comprising before step (b), applying a fugitive adhesive to at least one of the body of the binding edge strip and the body of the sheet, and step (b) includes folding the binding edge strip onto the body of the sheet such that the fugitive adhesive holds the binding edge strip in a folded-over position to the body of the sheet.

6. The process of claim 1 further comprising applying a guide strip along a tab edge of the sheet.

7. The process of claim 6 wherein the applying is before the folding.

8. The process of claim 1 wherein the notch, the end, the leg and the comer define a first notch, a first end, a first leg and a first comer, respectively, step (a) includes the sheet having a second notch cut out of a second comer of the sheet at a second end of the binding edge strip, and step (b) includes the folding including a second leg at the second notch being folded over onto the body, the second leg having a width narrower than the width of the body of the binding strip.

9. The process of claim 8 wherein the first and second legs have the same shapes and dimensions.

10. The process of claim 1 wherein the leg has a length of approximately ⅜ inch and a width of approximately 3/32 inch.

11. A manufacturing process, comprising the steps of:

(a) providing a sheet having a notch formed at a corner thereof at an end of a binding edge strip of the sheet;

(b) folding the binding edge strip onto a body of the sheet such that a leg at the notch and a body of the binding edge strip are folded over onto the body of the sheet, the leg having a width narrower than that of the body of the binding edge strip;

the notch being formed only on the binding edge strip; and wherein step (a) includes sheeting paper from a roll of paper to form a paper sheet and after the sheeting, notch cutting the comer of the sheet.

12. The process of claim 11 wherein step (a) includes applying a reinforcing strip to the binding edge strip before the notch cutting.

13. A manufacturing process, comprising the steps of:

(a) calendering a binding region of a portion of paper from a roll of paper;

(b) notch cutting an end comer of a foldable-over flap area of the binding region;

(c) forming a fold line between the foldable-over flap area and the rest of the binding region, the fold line being positioned to define a narrow leg of the foldable-over flap area along the fold line and at the notch cut; and (d) sheeting the portion of paper from the rest of the roll.

14. The process of claim 13 further comprising (e) slitting the portion of the paper.

15. The process of claim 14 wherein step (e) is before steps (b) and (c).

16. The process of claim 14 wherein step (e) is after steps (b) and (c).

17. The process of claim 13 further comprising (e) hole punching the foldable-over flap area.

18. The process of claim 17 wherein step (e) is before steps (b) and (c) and after step (a).

19. The process of claim 17 wherein step (b) is after step (e).

20. The process of claim 19 wherein steps (a), (c), and (d) are in a converting press machine, and step (b) is in a separate notch cutting machine.

21. The process of claim 13 wherein steps (a)–(d) are in a converting press machine.

22. The process of claim 13 wherein the fold line comprises a score line, and further comprising applying a reinforcing strip to the foldable-over flap area before step (b).

23. The process of claim 13 wherein the end comer is a first end comer, and step (b) further comprises cutting a second end comer of the foldable-over flap area at an opposite end of the foldable-over flap area as the first end comer.

24. A manufacturing process, comprising:

(a) providing a sheet having a notch formed at a comer thereof at an end of a binding edge strip of the sheet; and (b) folding the binding edge strip onto a body of the sheet such that a leg at the notch and a body of the binding edge strip are folded over onto the body of the sheet, the leg having a width narrower than that of the body of the binding edge strip; and wherein step (a) includes notch cutting paper from a roll and after the notch cutting, sheeting the paper into a sheet which includes the notch cut.

25. The process of claim 24 wherein step (a) includes applying a reinforcing strip to the binding edge strip before the notch cutting.

26. A manufacturing process, comprising the steps of:

(a) providing a sheet having a notch formed at a comer thereof at an end of a binding edge strip of the sheet; and (b) folding the binding edge strip onto a body of the sheet such that a leg at the notch and a body of the binding edge strip are folded over onto the body of the sheet, the leg having a width narrower than that of the body of the binding edge strip; and wherein step (a) includes sheeting paper from a roll of paper to form a paper sheet and after the sheeting, notch cutting the comer of the sheet.

27. The process of claim 26 wherein step (a) includes applying a reinforcing strip to the binding edge strip before the notch cutting.

28. A manufacturing process, comprising:

(a) providing a sheet having a notch formed at a comer thereof at an end of a binding edge strip of the sheet; and (b) folding the binding edge strip onto a body of the sheet such that a leg at the notch and a body of the binding edge strip are folded over onto the body of the sheet, the leg having a width narrower than that of the body of the binding edge strip; and the leg having a length of approximately $\frac{3}{8}$ inch and a width of approximately $\frac{3}{32}$ inch.

* * * * *